United States Patent [19]

Hattori et al.

[11] Patent Number: 4,810,554
[45] Date of Patent: Mar. 7, 1989

[54] HIGH STRENGTH CERAMIC HONEYCOMB STRUCTURE

[75] Inventors: Isao Hattori, Nagoya; Kouichi Ikeshima, Okazaki, both of Japan

[73] Assignee: NGK Insulators, Ltd., Nagoya, Japan

[21] Appl. No.: 34,047

[22] Filed: Apr. 6, 1987

[30] Foreign Application Priority Data

Apr. 8, 1986 [JP] Japan .................. 61-52367[U]

[51] Int. Cl.⁴ .................. B32B 3/12; B32B 3/20
[52] U.S. Cl. .................. 428/116; 55/523; 428/188; 502/527
[58] Field of Search .................. 428/116, 188, 118; 55/523; 156/89; 502/527

[56] References Cited

U.S. PATENT DOCUMENTS

| | | | |
|---|---|---|---|
| 3,853,485 | 12/1974 | Hogan | 428/118 X |
| 4,035,536 | 7/1977 | Morrison | 428/116 X |
| 4,042,738 | 8/1977 | Gulati | 428/116 |
| 4,233,351 | 11/1980 | Okumura et al. | 428/116 |
| 4,381,815 | 5/1983 | Frost et al. | 428/116 X |
| 4,448,828 | 5/1984 | Mochida et al. | 428/116 X |
| 4,448,833 | 5/1984 | Yamaguchi et al. | 428/116 |
| 4,489,774 | 12/1984 | Ogawa et al. | 428/307.7 X |
| 4,521,532 | 6/1985 | Cho | 428/116 X |
| 4,645,700 | 2/1987 | Matsuhisa et al. | 428/116 |

*Primary Examiner*—Henry F. Epstein
*Attorney, Agent, or Firm*—Parkhurst, Oliff & Berridge

[57] ABSTRACT

A high strength ceramic honeycomb structure includes a number of quadrilateral cells arranged adjacent to each other. Triangular cells are arranged in a zone in the proximity of an outer circumference of the honeycomb structure. Partitions of the triangular cells are oblique to partitions forming the quadrilateral cells and extending substantially toward a center of the honeycomb structure. The oblique partitions of the triangular cells serve to improve the isostatic strength of the honeycomb structure and to decrease the pressure losses.

12 Claims, 5 Drawing Sheets

FIG_3
PRIOR ART
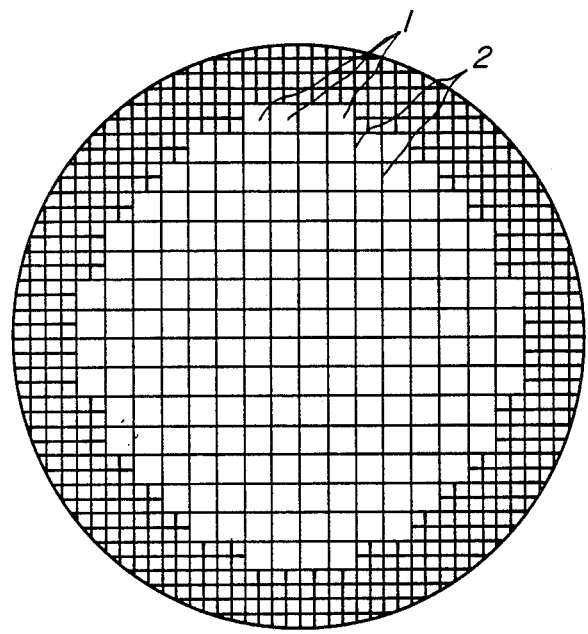

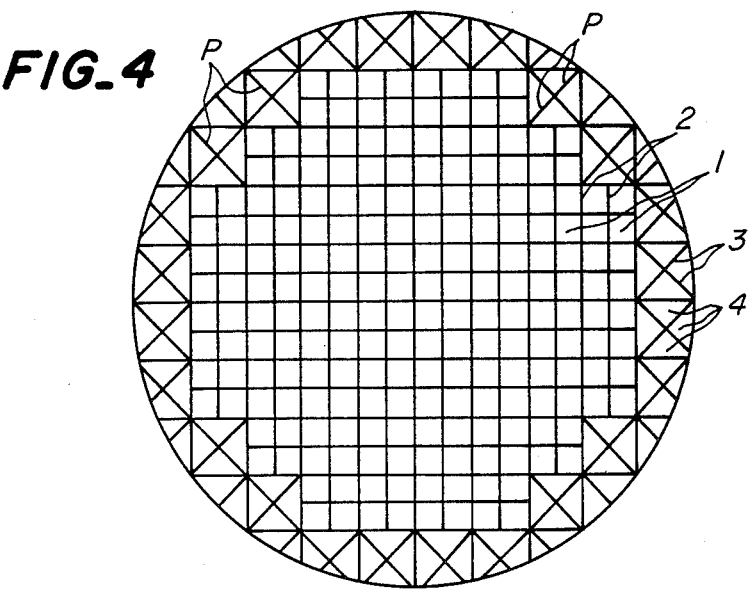
FIG._4
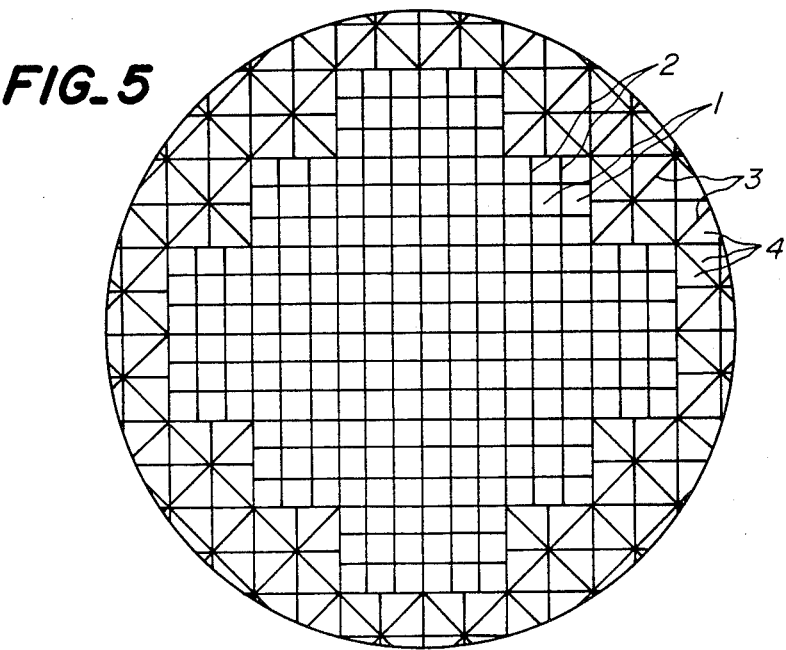
FIG._5

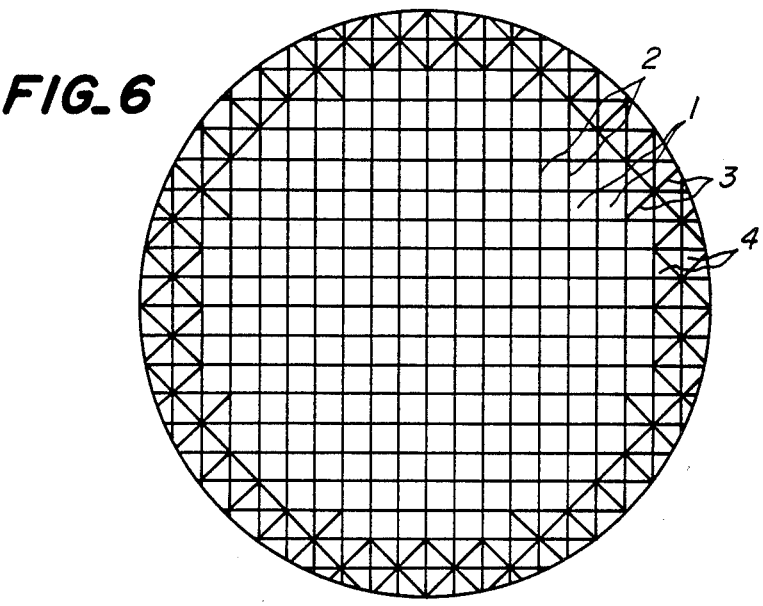
FIG._6
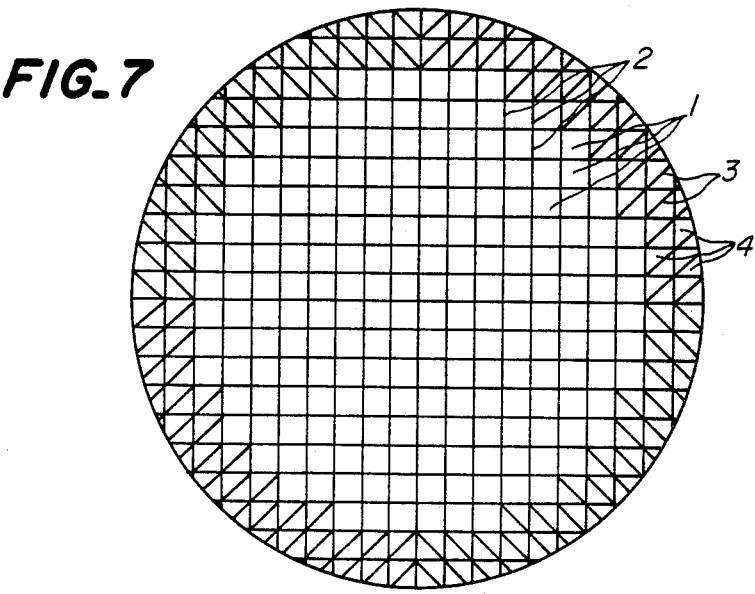
FIG._7

FIG_8
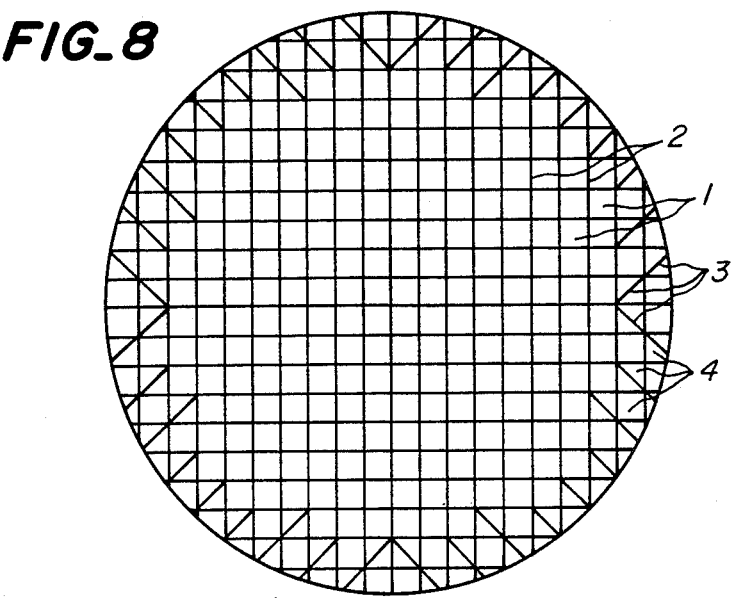
FIG_9
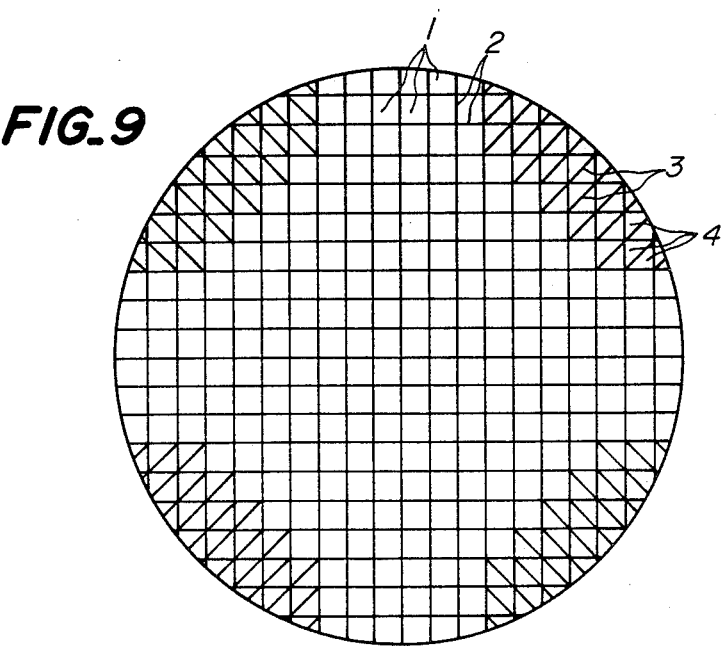

HIGH STRENGTH CERAMIC HONEYCOMB STRUCTURE

BACKGROUND OF THE INVENTION

This invention relates to a high strength ceramic honeycomb structure suitable for use in catalyzer carriers for purifying exhaust gases from automobile engines, or heat exchangers or deodorizers used in factories or homes.

Ceramic honeycomb structures have been widely used for catalyzer carriers for purifying automobile engine exhaust gases or heat exchangers. As the ceramic honeycomb structures are usually secured to insides of casings through ceramic mats or wire meshes and are used at high temperatures, strengths in radial directions on side surfaces (referred to hereinafter "isostatic strength") are more important than those in axial directions. Most of the honeycomb structures in actual cases include quadrilateral, particularly square cells owing to the fact that the honeycomb structures including the quadrilateral cells are easy to be manufactured and serve to reduce pressure losses. These honeycomb structures exhibit fairly high isostatic strength in directions perpendicular to the thickness of partitions of honeycomb structures. However, their isostatic strength in directions oblique to the partitions is very low. Therefore, there has been a risk of the honeycomb structures being broken off in diagonal directions in casings due to thermal stresses in use or forces mechanically acting upon the honeycomb structures being mounted in the casings.

In order to avoid such disadvantages, honeycomb structures have been proposed whose outer circumferential walls and partitions in the proximity of the outer circumferential walls are made thicker, as disclosed in Japanese Laid-Open Patent Applications Nos. 55-142,189, 55-147,154 and 55-155,741 as shown in FIG. 2, which is different from a conventional honeycomb structure having uniform wall thicknesses shown in FIG. 1. However, the honeycomb structures having the partially thicker walls and partitions increase pressure losses, and what is worse still, they decrease thermal shock strength. As shown in FIG. 3, a honeycomb structure has been also proposed, which includes fine cells in the proximity of an outer circumference as disclosed in Japanese Laid-Open Patent Application No. 55-155,742. This honeycomb structure likewise increases the pressure losses. Moreover, surface areas in the proximity of the outer circumference which are difficult for exhaust gases to flow through are increased to consume a great amount of expensive catalytic metal which is disadvantageous from economical viewpoint. Furthermore, a honeycomb structure has been proposed whose outer circumferential surface is coated with a glazed layer to increase the strength as disclosed in Japanese Laid-open Utility Model Application No. 53-133,860. However, manufacturing process for the honeycomb structure are complicated to increase manufacturing cost. Moreover, there is a difference in coefficient of thermal expansion between the glazed layer and the honeycomb structure itself which lowers the thermal shock strength of the structure.

SUMMARY OF THE INVENTION

It is a principal object of the invention to provide a high strength ceramic honeycomb structure which eliminates all the disadvantages of the prior art and has the high isostatic strength in all directions without increasing the pressure losses, without increasing the manufacturing cost and without decreasing the thermal shock strength.

In order to achieve this object, a high strength cermic honeycomb structure including a number of quadrilteral cells arranged adjacent to each other according to the invention comprises triangular cells arranged in a zone in the proximity of an outer circumference of the honeycomb structure and having partitions which are oblique to partitions forming said quandrilateral cells and extending substantially toward a center of the honeycomb structure.

With this arrangement, the oblique partitions of the triangular cells in the zone in the proximity of the outer circumference of the honeycomb structure serve to improve the isostatic strength of the structure and to decrease the pressure losses to a minimum as shown in the following comparative tests.

In a preferred embodiment of the invention, the quadrilateral cells are square and the triangular cells are isosceles right triangular, and the partitions of the triangular cells are at substantially 45° with the partitions forming the quadrilateral cells.

In another embodiment, an area of the four triangular cells is equal to that of the four quadrilateral cells. An area of the eight triangular cells may be equal to that of the nine quadrilateral cells, or an area of the two triangular cells may be equal to that of the one quadrilateral cells, or an area of the six triangular cells may be equal to that of the four quadrilateral cells.

In order that the invention may be more clearly understood, preferred embodiments will be described, by way of example, with reference to the accompanying drawings.

BRIEF DESCRIPTION OF THE DRAWINGS

FIG. 3 is a front view illustrating another honeycomb structure reinforced according to the prior art;

FIG. 4 is a front view showing a first embodiment of the honeycomb structure according to the invention;

FIG. 5 is a front view illustrating a second embodiment of the honeycomb structure according to the invention;

FIG. 6 is a front view illustrating a third embodiment of the honeycomb structure according to the invention;

FIG. 7 is a front view illustrating a fourth embodiment of the honeycomb structure according to the invention;

FIG. 8 is a front view showing a fifth embodiment of the honeycomb structure according to the invention; and FIG. 9 is a front view illustrating a sixth embodiment of the honeycomb structure according to the invention.

DESCRIPTION OF THE PREFERRED EMBODIMENTS

FIG. 4 illustrates a cylindrical honeycomb structure of a first embodiment of the invention having a diameter of 100 mm and a length of 100 mm. A number of square cells 1 are arranged with a density of 400 per an area of square inch. Partitions 2 constituting the square cells 1 have a thickness of approximately 0.13 mm (5 mil).

Triangular cells 4 having diagonal partitions 3 are arranged in a zone of a width of about 10 mm near to an outer circumference of the honeycomb structure. In this embodiment, these triangular cells 4 are provided over the entire circumference of the honeycomb structure. There are many partitions forming the triangular cells 4. Among these partitions, important partitions for improving the isostatic strength are those oblique at 45° to partitions forming the square cells and extending substantially toward a center of the honeycomb structure. Such partitions are shown by P in FIG. 4.

In the embodiment shown in FIG. 4, the four triangular cells 4 having the diagonal partitions are arranged in an area corresponding to an area of four square cells 1 at the center of the honeycomb structure. Accordingly, a number ratio of the triangular cells to the square cells is 1/1. In another embodiment shown in FIG. 5, a number ratio is 8/9, while in further embodiments shown in FIGS. 6 and 7, a number ratio is 2/1. On the other hand, in a particular embodiment shown in FIG. 8 which includes square cells in an outer circumferential zone, a number ratio is 2/1. When the number ratio is increased by forming small triangular cells 4 in the outer peripheral zone, the isostatic strength is improved, but the pressure losses are increased. It is therefore preferable to determine the number ratio to be less than 2/1, more preferably as near to 1/1 as possible. In an embodiment shown in FIG. 9, diagonal partitions 3 are provided only in directions effective to increase the isostatic strength of the structure. A number ratio is 2/1 in this case. However, the number ratio is not limited to this value. Although the honeycomb structures are circular in cross-section of the outer circumferences in the embodiments above described, the invention is of course applicable to honeycomb structures elliptical in cross-section which have been widely used.

Ceramic honeycomb structures having cell densities 100–600 cells per square inch are widely used, in which case triangular cells are usually arranged in widths corresponding to 4–10 square cells or 4–13 mm from outer circumferences toward centers.

Figure 1:
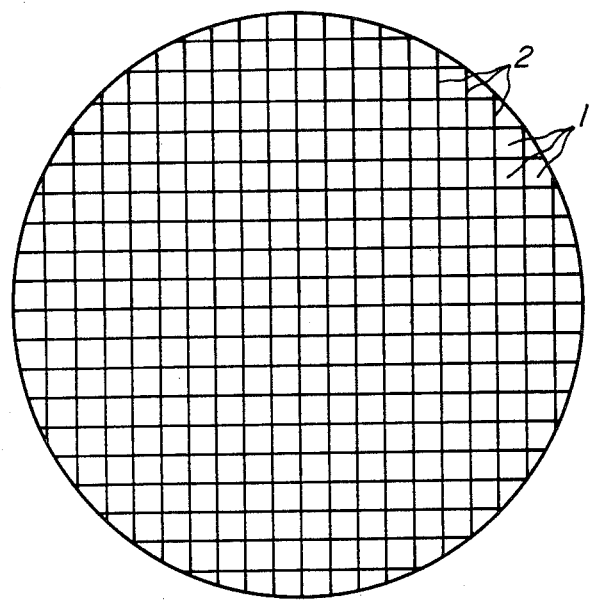
FIG. 1 is a front elevation illustrating a conventional honeycomb structure.
Figure 2:
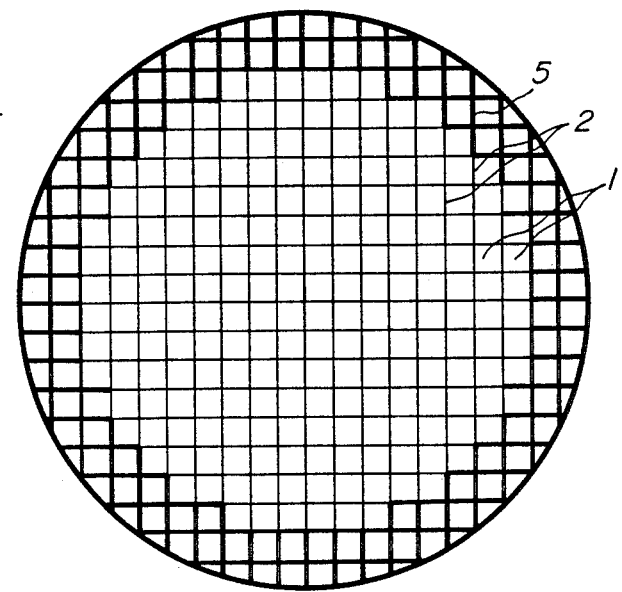
FIG. 2 is a front view showing a honeycomb structure reinforced according to the prior art.

In order to ascertain the effects of the present invention, comparative tests have been carried out with the honeycomb structures of the first embodiment of the present invention and those of the prior art shown in FIGS. 1-3. Results of the tests are shown in Table 1. The honeycomb structures of the prior art I are those having uniform wall cells as shown in FIG. 1. The honeycomb structures of the prior art II are those having outer circumferential walls and partitions in zones of widths of about 10 mm in outer peripheries, thicknesses of these walls and partitions being 1.6 times those of partitions at the center as shown in FIG. 2. On the other hand, the honeycomb structures of the prior art III are those having zones of widths of about 10 mm in outer peripheries, in which zones there are cells having densities four times those at centers of the honeycomb structures. All the honeycomb structures have diameters of 100 mm and lengths 100 mm.

Testing methods are as follows.

Isostatic strength

Aluminum plates of an about 20 mm thickness were applied to both end surfaces of each the honeycomb structure through urethane sheets of an about 0.5 mm thickness. A side surface of the honeycomb structure was sealed by an urethane tube of an approximately 0.5 mm thickness. The sealed honeycomb structure was arranged in a hydraulic vessel whose pressure was then progressively increased. Pressure was measured when breaking sound occurred in the vessel.

TABLE 1

| | | Present invention | Prior art I | Prior art II | Prior art III |
|---|---|---|---|---|---|
| Cell structure | Thickness of partition mm | 0.13 | 0.13 | 0.13 0.2 (outer zone) | 0.13 |
| | Number of cell per area of square inch | 400 | 400 | 400 | 400 1600 (outer zone) |
| Isostatic strength kg/cm$^2$ | | 15 | 4 | 18 | 9 |
| Deformation of cell | | none | deformed in zone 5 mm from outer circumference | none | deformed in zone 2 mm from outer circumference |
| Thermal shock-resistance difference in temperature °C. | | 850 | 850 | 788 | 825 |
| Pressure loss mm H$_2$O | | 54 | 52 | 56 | 60 |
| Flow rate m/sec | | 8.5 | 8.5 | 4.0 | 0.2 |

Thermal shock-resistance

The honeycomb structures were charged in an electric furnace whose inner temperature was maintained at a temperature higher than 720° C. After the honeycomb structures were kept in the electric furnace for twenty minutes, the structures were removed from the furnace and arranged on refractory bricks so as to be cooled to room temperature. If cracks did not occur on the structures in the cooling process, the same test was repeated with the furnace whose temperature was raised by 50° C. steps. A temperature difference was measured, which was between room temperature and the maximum temperature at which any crack did not occur. The values in the Table are mean values with the four honeycomb structures.

Pressure losses and flow rate

Air at the room temperature was forced to flow through each of the honeycomb structure at 3 m$^3$/min and the pressure difference between front and rear ends of the structure was measured. Moreover, flow rates were measured at locations spaced by 7 mm from an outer circumference of the honeycomb structure.

As can be seen from the above description, the honeycomb structure comprises triangular cells arranged in a zone in the proximity of an outer circumference of the structure and having partitions which are oblique to partitions forming the quadrilateral cells in the center of the structure and extending substantially toward a center of the structure to considerably increase the isostatic strength in directions oblique to the partitions of the quadrilateral cells and to decrease pressure losses in comparison with the reinforced honeycomb structures of the prior art II and III.

The ceramic honeycomb structure according to the invention enables exhaust gases to flow through outer circumferential zones of the structure at high flow rates so that the exhaust gases fairly flow through the outer circumferential zones. Accordingly, the ceramic honeycomb structure in its entirely serves to purify the exhaust gases effectively. Moreover, thermal stresses caused by the exhaust gases do not concentrate at the center of the structure, so that the thermal shock strength is improved. Moreover, the honeycomb structure according to the invention does not give rise to the manufacturing cost because it is easily produced by extruding-forming method. Accordingly, the honeycomb structure according to the invention is of high strength to eliminate all the disadvantages of the prior art and very valuable for practical use.

It is further understood by those skilled in the art that the foregoing description is that of preferred embodiments of the disclosed honeycomb structures and that various changes and modifications may be made in the invention without departing from the spirit and scope thereof.

What is claimed is:

1. A high strength ceramic honeycomb structure comprising:
    a first plurality of quadrilateral cells arranged adjacent each other and located substantially at an interior protion of said structure; and
    a second plurality of quadrilateral cells arranged adjacent each other and located substantially at an outer peripheral portion of said structure, said second plurality of cells including partitions formed therein such that said second plurality of cells contains at least two isosceles right triangular cells, and said partitions extend substantially toward said interior portion of said structure.

2. A structure according to claim 1, wherein said second plurality of quadrilateral cells are located at select portions of the outer peripheral portion of said structure, said select portions being located at oblique directions to the partitions which form said first plurality of quadrilateral cells.

3. A structure according to claim 1, wherein said first plurality of quadrilateral cells are square.

4. A structure according to claim 1, wherein an area of four triangular cells is substantially equal to an area of four quadrilateral cells.

5. A structure according to claim 1, wherein an area of eight triangular cells is substantially equal to an area of nine quadrilateral cells.

6. A structure according to claim 1, wherein an area of two triangular cells is substantially equal to an area of one quadrilateral cell.

7. A structure according to claim 1, wherein an area of six triangular cells is substantially equal to an area of four quadrilateral cells.

8. A high strength ceramic honeycomb structure comprising:
    a first plurality of quadrilateral cells arranged adjacent each other and located substantially at an interior portion of said structure; and
    a second plurality of quadrilateral cells arranged adjacent each other and located substantially at an outer peripheral portion of said structure, said second plurality of cells including partitions formed therein such that said second plurality of cells contains at least four isosceles right triangular cells, and said partitions extend substantially toward said interior portion of said structure.

9. A structure according to claim 8, wherein said second plurality of quadrilateral cells are located at select portions of the outer peripheral portion of said structure, said select portions being located at oblique directions to the partitions which form said first plurality of quadrilateral cells.

10. A high strength ceramic honeycomb structure comprising:
    a first plurality of quadrilateral cells arranged adjacent each other and located at an interior portion of said structure; and
    a second plurality of quadrilateral cells arranged adjacent each other and located at the outer peripheral portion of said structure, said second plurality of cells including partitions formed therein such that said plurality of cells contain at least two isosceles right triangular cells, and said partitions extend substantially toward said interior portion of said structure.

11. A structure according to claim 10, wherein said second plurality of quadrilateral cells are located at select portions of the outer peripheral portion of said structure, said select portions being located at oblique directions to the partitions which form said first plurality of quadrilateral cells.

12. A structure according to claim 10, wherein said second plurality of cells contain at least four isosceles right triangular cells.

* * * * *